(12) United States Patent
Otsuji et al.

(10) Patent No.: US 7,128,023 B2
(45) Date of Patent: Oct. 31, 2006

(54) PET TOILET

(75) Inventors: Kazuya Otsuji, Tokyo (JP); Yasuki Tsutsumi, Tokyo (JP); Jun Yamamoto, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/298,057

(22) Filed: Nov. 18, 2002

(65) Prior Publication Data
US 2003/0094140 A1 May 22, 2003

(30) Foreign Application Priority Data
Nov. 19, 2001 (JP) .............................. 2001-353618

(51) Int. Cl.
*A01K 29/00* (2006.01)
(52) U.S. Cl. ..................... 119/169; 119/161
(58) Field of Classification Search ............... 119/165, 119/161, 166, 167, 169, 170; 604/381; 428/131
See application file for complete search history.

(56) References Cited

U.S. PATENT DOCUMENTS

| | | | | |
|---|---|---|---|---|
| 3,978,818 A | * | 9/1976 | Heldenbrand | 119/170 |
| 4,487,163 A | * | 12/1984 | Jobert et al. | 119/166 |
| 4,494,482 A | | 1/1985 | Arnold | |
| 4,715,320 A | * | 12/1987 | Barnhart | 119/169 |
| 4,870,924 A | | 10/1989 | Wolfe | 119/161 |
| 5,038,721 A | | 8/1991 | Ouellette et al. | |
| 5,193,488 A | | 3/1993 | Walton | 119/161 |
| 5,614,283 A | * | 3/1997 | Potnis et al. | 428/131 |
| 5,730,737 A | | 3/1998 | Widlund et al. | |
| 5,819,688 A | | 10/1998 | Walker | 119/169 |
| 5,877,097 A | | 3/1999 | West et al. | |
| 6,059,247 A | * | 5/2000 | Olivadoti | 119/161 |
| 6,395,957 B1 | * | 5/2002 | Chen et al. | 604/381 |
| 6,550,423 B1 | * | 4/2003 | Pope | 119/161 |
| 2001/0009142 A1 | | 7/2001 | Otsuji et al. | 119/165 |

FOREIGN PATENT DOCUMENTS

| | | |
|---|---|---|
| DE | 100 12 998 | 9/2001 |
| EP | 0 781 806 | 7/1997 |
| EP | 0 808 563 | 11/1997 |
| EP | 0 934 695 | 8/1999 |
| FR | 2 618 641 | 2/1989 |
| JP | 1-105448 | 7/1989 |
| JP | 7-67489 | 3/1995 |
| JP | 9-308403 | 12/1997 |
| JP | 3079138 | 5/2001 |
| JP | 2001/218535 | 8/2001 |
| JP | 2001-258416 A | 9/2001 |
| WO | WO 88/00434 | 1/1988 |

* cited by examiner

*Primary Examiner*—Robert P. Swiatek
*Assistant Examiner*—Elizabeth Shaw
(74) *Attorney, Agent, or Firm*—Oblon, Spivak, McClelland, Maier & Neustadt, P.C.

(57) ABSTRACT

A pet toilet comprising a shallow tray 2, a plate-shaped urine absorbent mat 3 which is put in the tray 2, and a perforated film 4 which has a number of openings H and covers the entire upper surface of the absorbent mat 3 is disclosed. The openings H of the perforated film 4 have a sidewall extending from one side to the other side of the film. The perforated film 4 is fixed at such a position that at least the lower end of the sidewall of the openings H is in contact with the upper surface of the urine absorbent mat 3.

5 Claims, 2 Drawing Sheets

PET TOILET

BACKGROUND OF THE INVENTION

The present invention relates to a pet toilet which is conveniently used to raise various domesticated pets, particularly dogs.

JP-A-7-67489 proposes a litter box for treating excreta of pets such as dogs and cats which has a porous member partitioning the litter box into upper and lower parts, water-repellent litter placed on the porous member, and a particulate or granular absorbent member made of an absorbent polymer placed under the porous member.

This litter box is, however, designed to keep the litter in the upper part always dry by making the lower absorbent member absorb liquid waste. In other words, it chiefly aims at urine treatment. When a pet has eliminated its solid waste, the whole litter must be exchanged for fresh one. In this respect there is no difference from common litter, still leaving the problems of laboriousness and bad economy. Further, when a large quantity of urine has been absorbed, urine easily migrates backward to soil the pet's limbs.

An object of the present invention is to provide a pet toilet which hardly allows absorbed urine to migrate outside even after absorbing a large quantity of urine.

Another object of the present invention is to provide a pet toilet with which both liquid and solid wastes can be disposed of easily and economically.

SUMMARY OF THE INVENTION

The above objects of the present invention are accomplished by a pet toilet comprising a shallow tray, a plate-shaped urine absorbent mat which is put in the tray, and a perforated film which has a number of openings and covers the entire upper surface of the absorbent mat, the openings of the perforated film being three-dimensional and having a sidewall extended from one side to the other side of the film, and the perforated film being fixed at such a position that at least the lower end of the sidewall of the openings is in contact with the upper surface of the urine absorbent mat.

The present invention also provides a method of disposing of pet's excreta by using the pet toilet described infra, which comprises removing the perforated film on which a pet has discharged excrement, wrapping the excrement in the perforated film, and discarding the excrement as wrapped.

BRIEF DESCRIPTION OF THE DRAWINGS

The present invention will be more particularly described with reference to the accompanying drawings, in which.

DETAILED DESCRIPTION OF THE PREFERRED EMBODIMENTS

Figure 1:
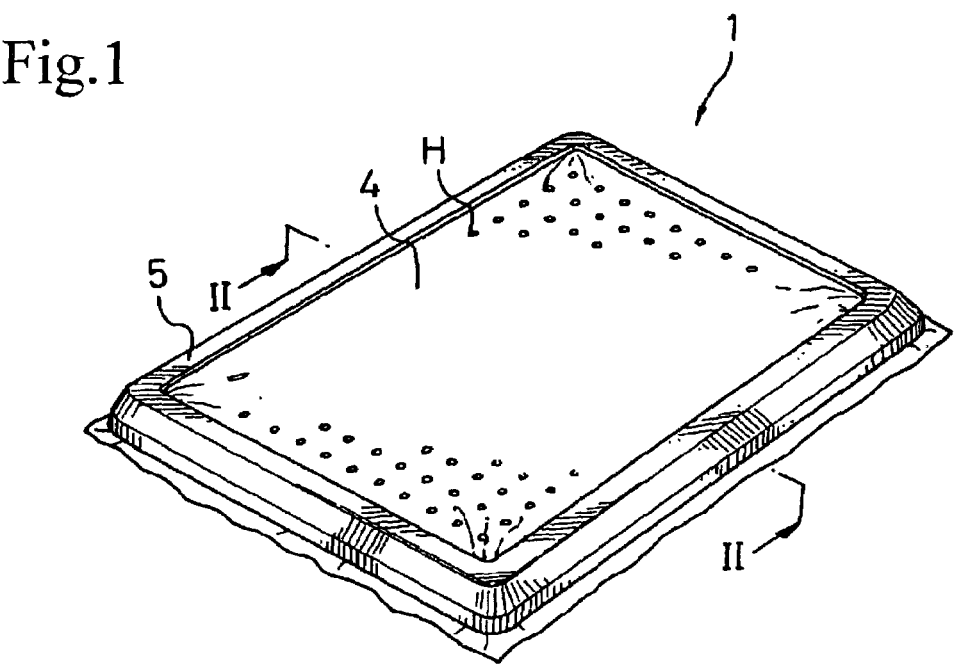
FIG. 1 is a perspective showing an embodiment of the pet toilet according to the present invention.
Figure 2:
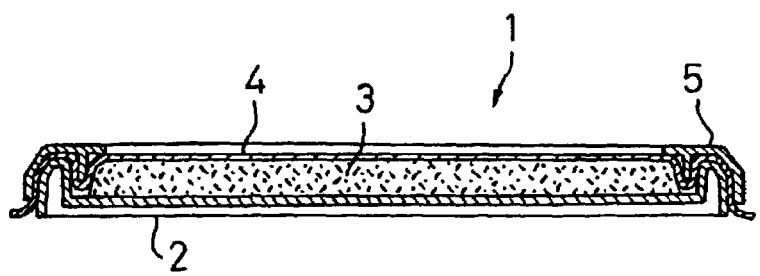
FIG. 2 is a cross-section of FIG. 1, taken along line II-II.
Figure 3:
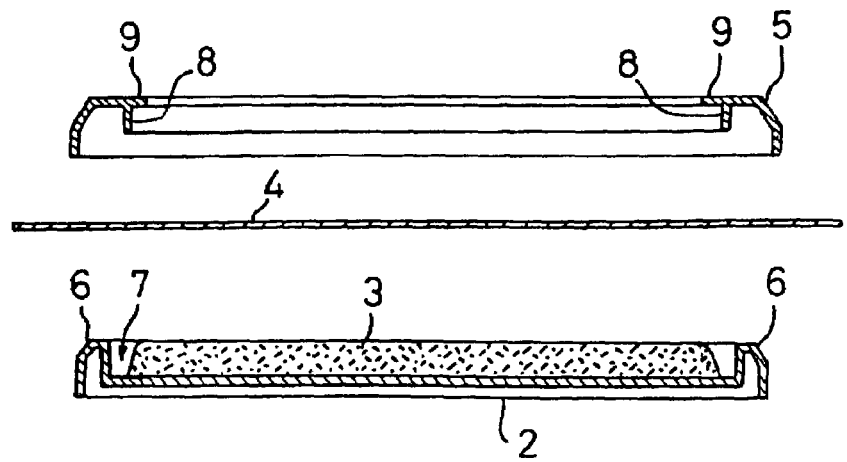
FIG. 3 is an exploded view of FIG. 2.

The present invention will be described with reference to its preferred embodiment by referring to the accompanying drawings. FIG. 1 is a perspective showing an embodiment of the pet toilet according to the present invention. FIG. 2 is a cross-section of the pet toilet shown in FIG. 1, taken along line II—II. FIG. 3 is an exploded view of FIG. 2.

The pet toilet 1 shown in FIGS. 1 to 3 is particularly fit for large animals. It has a shallow tray 2, a plate-shaped urine absorbent mat 3, a perforated film 4, and a film holding frame 5.

The tray 2 is rectangular in its plan view and has its four edges 6 raised to form a shallow depression 7, which is also rectangular in its plan view and in which the absorbent mat 3 is put. The height of the raised edges 6 from the bottom of the depression 7 is substantially the same as the thickness of the absorbent mat 3.

The urine absorbent mat 3 has a plate shape. The number of the urine absorbent mat 3 placed in the depression 7 is one. It is preferred for the urine absorbent mat 3 to have a flat surface on at least the side facing the perforated film 4 so that the mat 3 and the perforated film 4 may be brought into intimate contact to leave no space allowing urine to remain therebetween. Generation of an offensive odor from remaining urine is thus suppressed.

The urine absorbent mat 3 is preferably a molded plate formed of a molding material containing plant fiber or pulp or clay minerals. The details of the materials forming the absorbent mat 3 will be described later.

The absorbent mat 3 preferably has a thickness of 3 mm or more, still preferably 5 to 50 mm, particularly preferably 10 to 20 mm. The mat with this thickness assures increased urine absorptivity and enhanced strength compared with an absorbent sheet or pad. Unlike granular litter, the mat produces little dust when handled and is easy to dispose of.

The absorbent mat 3 preferably has a bulk density of 0.05 to 0.3 g/cm$^3$, particularly 0.1 to 0.25 g/cm$^3$, especially 0.15 to 0.2 g/cm$^3$. The mat with this bulk density exhibits an increased rate of urine absorption while retaining sufficient strength for use. The bulk density (g/cm$^3$) of the mat is obtained by measuring the thickness (t) of a 6 cm wide and 6 cm long piece cut out of the mat, weighing the cut piece and dividing the weight (g) by the volume of the cut piece (36t cm$^3$).

Figure 4:
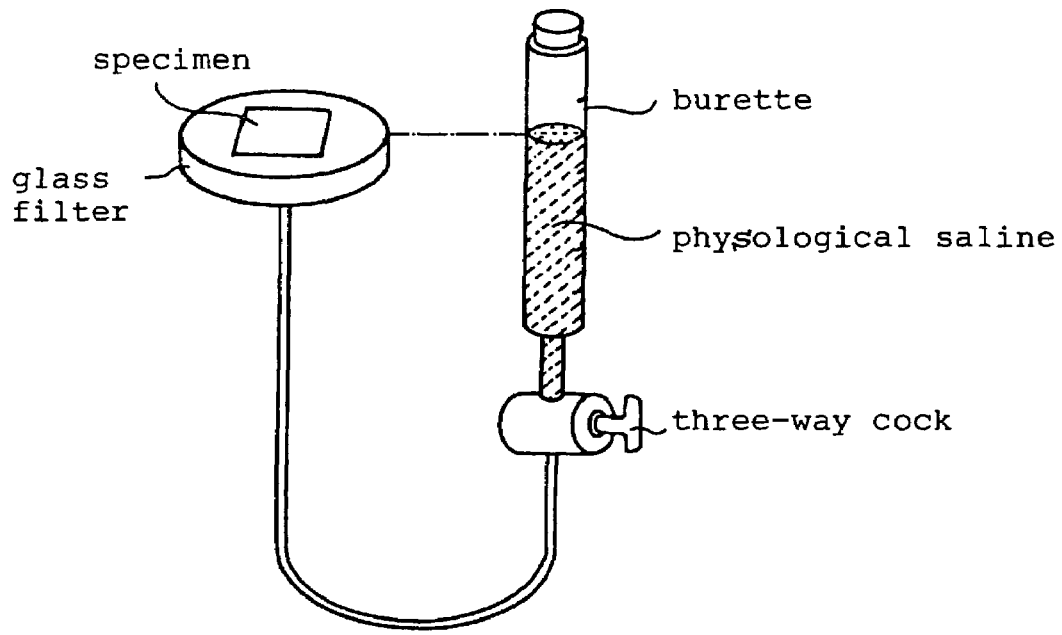
FIG. 4 schematically illustrates a method of measuring a saturated water absorption of a urine absorbent mat.

The urine absorbent mat 3 exhibits excellent urine absorbing performance. To secure sufficient absorptivity, it is preferred for the absorbent mat 3 to have a saturated water absorption of 2 g/g or more, preferably 5 g/g or more, still preferably 8 g/g or more. The higher the saturated water absorption, the better. The upper limit of the saturated water absorption, while not limited, would be practically about 10 g/g. The saturated water absorption is measured as follows by use of a demand wettability tester shown in FIG. 4, which is well known as an apparatus for carrying out a demand wettability (DW) test. A 60 mm wide and 60 mm long specimen is cut out of the mat (thickness: as made), dried in a drier set at 105° C. for 1 hour, and then allowed to cool to room temperature in a desiccator. The thus conditioned specimen is put on a glass filter set on the same level with the liquid level of physiological saline in the burette as shown in FIG. 4. The three-way cock is opened to let the specimen absorb physiological saline. When bubbling in the burette stops, the scale of the burette which indicates the reduction of physiological saline in amount is read to obtain the amount of water (g) absorbed to saturation. The test was carried out in triplicate (n=3), and the average is obtained.

To prevent the four limbs of a pet from being soiled with its own liquid waste, it is preferred for the absorbent mat 3 to have a rate of absorption of 30 sec or shorter, preferably 10 sec or shorter, still preferably 3 sec or shorter. There is no upper limit of the rate of absorption, and the faster, the better. A practical upper limit would be about 1 second. The rate of absorption is measured as follows. A 60 mm wide and 60 mm long specimen is cut out of the mat (thickness: as made) dried in a drier set at 105° C. for 1 hour and then allowed to cool to room temperature in a desiccator. In the center of the thus conditioned specimen is dropped 2.5 cc of physiological saline, and the time required for the liquid immediately after completion of dropping to be absorbed by the specimen is taken as a rate of absorption (sec). The measurement was made in triplicate (n=3) to obtain an average.

Figure 5:
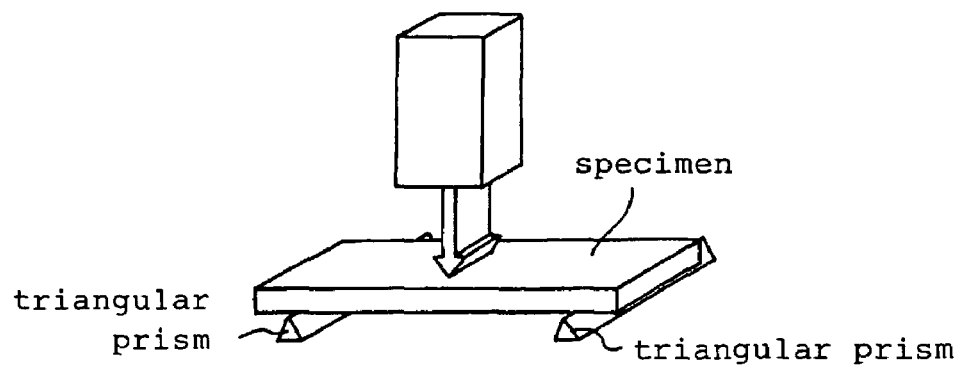
FIG. 5 schematically illustrates a method of measuring a wet strength of a urine absorbent mat.

The absorbent mat 3 preferably has a wet strength of 49 cN or more, particularly 98 cN or more, especially 196 cN or more. With this wet strength the mat retains its plate shape after absorbing urine and can be handled and disposed of with ease. The higher the wet strength, the better. Taking the balance with other strength characteristics demanded into consideration, however, a practical upper limit would be around 196 cN. The wet strength is measured as follows. A specimen of 25 mm in width and 80 mm in length (thickness: as made) cut out of the mat is soaked in water for 5 minutes. As shown in FIG. 5, the soaked specimen is placed on two triangular prisms 50 mm apart with the longitudinal middle of the specimen agreeing with the middle of the distance between the two prisms. A push-pull gauge is pressed down at that middle of the specimen, and the gauge pressure at break is measured to obtain a wet strength (cN). The measurement was made in triplicate (n=3) to obtain an average.

The perforated film 4 covering the entire upper surface of the absorbent mat 3 is a thermoplastic resin film which has a large number of openings and thereby exhibits permeability to liquid. The perforated film 4 may be subjected to a hydrophilizing treatment to have improved liquid permeability. Since a pet, such as a dog, gets rid of its waste on the perforated film 4, it is preferred for the perforated film 4 to have sufficient strength, especially scratch resistance. From this viewpoint, the perforated film 4 preferably has a basis weight of 20 to 40 $g/m^2$, particularly 25 to 35 $g/m^2$.

Figure 6:
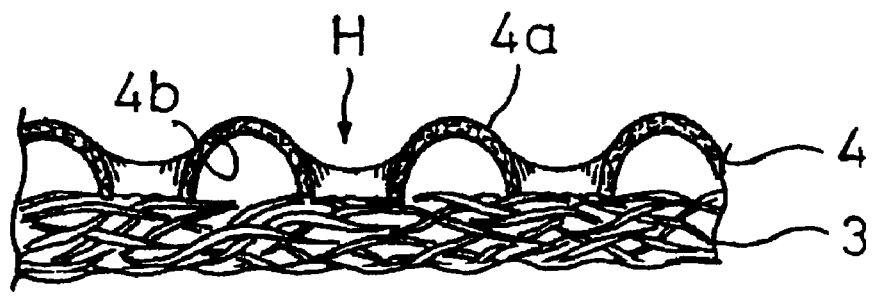
FIG. 6 is an enlarged cross-section of an essential part of the pet toilet shown in FIG. 1.

As shown in FIG. 6, each opening H of the perforated film 4 is three-dimensional, having a sidewall extending from one side 4a toward the other side 4b of the film. The inner side of the side wall is an extension of the side 4a of the film. The opening H is circular in its plan view. The diameter of the opening H gradually decreases from the side 4a toward the side 4b to form a funnel-like shape. The diameter of an opening H at the lower end of the sidewall is preferably 0.1 to 2 mm, still preferably 0.2 to 1.4 mm, so that the film may have sufficient liquid permeability while preventing urine having been once absorbed by the absorbent mat 3 from migrating backward. The open area ratio (the ratio of total area of the openings H to the area of the film 4 before perforating) is preferably 4 to 20%, still preferably 10 to 16%. The diameter of the openings and the open area ratio of the perforated film are measured by the following methods.

Measurement of Opening Diameter:

The image data of a perforated film 4 fixed to a black mount are binarized into black and white pixels (white portions correspond openings) on an image analyzer EXCEL available from Nippon Avionics Co., Ltd. The circle-equivalent diameter of the white portion is taken as an opening diameter.

Measurement of Open Area Ratio:

The image data of a perforated film 4 fixed to a black mount are binarized into black and white pixels (white portions correspond openings) on an image analyzer EXCEL available from Nippon Avionics Co., Ltd. The area ratio of the white portions to the total image area is taken as an open area ratio.

The perforated film with three-dimensional openings is prepared by extruding a molten thermoplastic resin, such as polyolefins (e.g., polyethylene and polypropylene), polyesters (e.g., polyethylene terephthalate), and vinyl polymers (e.g., polyvinyl chloride), on a punching metal with a great number of holes and simultaneously subjecting the extruded film to vacuum draw through the holes from the other side of the punching metal. By the vacuum draw, the resin stretches through the holes to make sidewalls and ruptures to make apertures.

The perforated film 4 is laid on the absorbent mat 3 with its 4a side up and 4b side facing the mat 3. The perforated film 4 extends from the periphery of the absorbent mat 3, and is larger in area than the tray 2 enough to extend from the raised edges 6. When the holding frame 5 described infra is fitted over the raised edges 6 of the tray 2, the perforated film 4 is, being present between the holding frame 5 and the raised edges 6, fixed and brought into tight contact with the upper side of the absorbent mat 3. In more detail, as shown in FIG. 6, at least the lower ends of the sidewalls of the openings H are in contact with the upper surface of the absorbent mat 3. Thus discharged urine quickly passes through the openings H and is absorbed by the absorbent mat 3, and urine, once absorbed, is effectively prevented from migrating or penetrating backward through the film. Where not only the sidewall ends of the openings H but the 4b side of the perforated film 4 are in contact with the upper surface of the absorbent mat 3, urine is not allowed to stay between the film 4 and the mat 3. This will be more effective to suppress generation of offensive odors.

The holding frame 5, viewed from above, is shaped to fit on the raised edges 6 of the tray 2. The inner side of the holding frame 5 is also shaped to fit on the raised edges 6 as shown in FIGS. 2 and 3. The holding frame 5 has a rib 8 pendent from the top frame and facing to the inner side of every raised edges 6. The rib 8 is a continuous one-piece parallel with all the raised edges 6 of the holding frame 5. Assembled into a pet toilet 1, the perforated film 4 is clamped between the rib 8 and the inner surface of the raised edges 6 in the tray 2. Since the rib 8 and the raised edges 6 are continuous, the perforated film 4 is fixed flat over the whole width and length at every side thereof. As a result, the perforated film is effectively prevented from wrinkling, and urine is therefore prevented from remaining on the perforated film 4.

Usage of the pet toilet 1 according to the embodiment supra is then described. A housebroken pet such as a dog gets rid of its waste on the perforated film 4. When urine is discharged, it is quickly absorbed by the absorbent mat 3 through the perforations of the perforated film 4. Since the sidewall ends of the openings H of the perforated film 4 are in close contact with the upper surface of the absorbent mat 3 as stated, urine is rapidly absorbed by the absorbent mat 3 with little remaining on the perforated film 4. Migration of urine back to the outer surface of the perforated film 4 is extremely suppressed. Generation of offensive odors from urine is thus effectively prevented. Generation of offensive odors is more effectively prevented by incorporating a deodorizing agent or an antimicrobial agent into the urine absorbent mat 3 as described infra. Therefore, the pet toilet 1 can be used very hygienically with no particular need to consider where to place. Having sufficiently high absorptivity, the absorbent mat 3 is capable of absorbing a large amount of urine. Owing to the high absorption capacity and the prevention of offensive odor emanation, the absorbent mat 3 can serve for a long time without a replacement. Since the absorbent mat 3 has a high wet strength and retains its shape after absorption as described above, it is easily removed from the tray 2 and disposed of or incinerated as a combustible waste.

When a pet eliminates solid waste, on the other hand, the holding frame 5 is detached from the tray 2 to release the perforated film 4, and the solid waste is wrapped in the perforated film 4 and disposed of. In this way, a pet owner can easily treat the waste without soiling his or her hands. At this time, an owner may change the absorbent mat 3 for a new one or continue using the same absorbent mat 3 according to the amount of urine that has been absorbed.

Thus, the pet toilet 1 according to the present invention makes it possible to easily treat pet's waste, whether liquid or solid.

Materials constituting the absorbent mat 3 will then be described. The absorbent mat 3 is made of a material comprising plant fiber, pulp or a clay mineral.

Where the absorbent mat 3 comprises plant fiber or pulp (hereinafter inclusively referred to as an absorbing base material), it is preferred for the absorbent mat 3 to further comprise an antimicrobial surface active agent or a combination of a surface active agent and an antimicrobial agent and at least one of a binder, a crosslinking agent, and water. The term "plant fiber" as used herein means fiber that constitutes plants or an aggregate thereof. Plant fiber comprises not only cellulose but lignin, hemicellulose, a resinous component, ash, and others. The term "pulp" as used herein means plant fiber freed of the components other than cellulose to have a high cellulose purity. What we call chemical pulp corresponds to the "pulp".

The plant fiber includes groundwood pulp, sawdust, jute, and palm fiber. These fibers can be used either individually or as a mixture thereof. From the standpoint of absorptivity, deodorizing effect, and stable supply, groundwood pulp and/or sawdust are preferred. The term "groundwood pulp (GP)" as used herein is intended to include not only groundwood pulp in the narrow sense of the word but other kinds of mechanical pulp, such as stone ground pulp (SGP), refiner ground pulp (RGP) and thermomechanical pulp (TMP). Of these groundwood pulp kinds, SGP is particularly preferred for its deodorizing action.

It is preferable to use pulp of used paper. De-inked pulp is particularly preferred for securing absorptivity.

The plant fiber and the pulp can be used as an absorbing base material either individually or as a mixture thereof. When used as a mixture, the plant fiber and the pulp are mixed at a weight ratio of 10:1 to 1:100.

The absorbent mat 3 preferably comprises 50 to 95% by weight, particularly 70 to 90% by weight, of the plant fiber and/or the pulp to have necessary strength as well as improved absorptivity and deodorizing effect.

The surface active agent which can be incorporated into the absorbent mat 3, whether antimicrobial or non-antimicrobial, is used to improve hydrophilicity and increase the rate of absorption. The presence of the surface active agent as well as the low density and the porosity of the absorbent mat 3 secures an increased absorption and an increased rate of absorption.

An antimicrobial surface active agent suppresses growth of microorganisms which decompose excreta, such as urine, to generate ammonia, so that the absorbent mat 3 may be used for an extended period of time without emanating a pungent odor. A surface active agent having no antimicrobial activity is used in combination with an antimicrobial agent to produce the same effects.

Antimicrobial surface active agents include cationic ones and amphoteric ones. Useful antimicrobial cationic surface active agents include an alkyltrimethylammonium chloride, a dialkyldimethylammonium chloride, and benzalkonium chloride, and mixtures of two or more thereof, with benzalkonium chloride being preferred for its antimicrobial activity. Useful antimicrobial amphoteric surface active agents include an alkyldimethylaminoacetic acid betaine, an alkyldimethylamine oxide, an alkylcarboxymethylhydroxyethylimidazolinium betaine, an alkylamidopropyl betaine, and mixtures of two or more thereof, with an alkyldimethylamine oxide being preferred for its antimicrobial and deodorizing effects. If desired, the antimicrobial surface active agent can be used in combination with an antimicrobial agent to further enhance the antimicrobial activity of the absorbent mat 3. In this case, the antimicrobial agent to be combined is preferably water soluble.

To obtain substantial effects in improving absorptivity and preventing pungent odor generation thereby to guarantee long serviceability, it is preferred for the absorbent mat 3 to contain 0.1 to 5% by weight, particularly 0.5 to 3% by weight, of the antimicrobial surface active agent.

The surface active agents having no antimicrobial activity include nonionic surface active agents, such as glycerol fatty acid esters, sorbitan fatty acid esters, polyoxyethylene sorbitan fatty acid esters, polyoxyethylene alkyl ethers, polyoxyethylene glycol fatty acid esters, and mixtures of two or more thereof. From the standpoint of water solubility, those having an HLB of 10 to 19 as calculated by an HLB numerical system are preferred. The antimicrobial agents which can be used in combination with the non-antimicrobial surface active agent are preferably water-soluble and include sodium benzoate, chloramine T, chlorocresol, sodium salicylate, ethyltrimethylammonium bromide, potassium sorbate, sodium dehydroacetate, p-chlorophenol, phenol, and mixtures of two or more thereof. Sodium benzoate is preferred from the viewpoint of odor and safety to animals.

The non-antimicrobial surface active agent is preferably used in amounts of 0.01 to 5% by weight, particularly 0.1 to 5% by weight, especially 0.1 to 2% by weight, and the antimicrobial agent is preferably used in amounts of 0.001 to 5% by weight, particularly 0.1 to 0.5% by weight, both based on the absorbent mat 3.

The binder, crosslinking agent or water is used as a means for binding the individual plant fibers and/or the individual pulp fibers (hereinafter these components will be inclusively referred to as an interfibrous binder). The interfibrous binder makes the absorbent mat 3 strong enough for practical use, easy to handle and dispose of, and durable for a long time.

The crosslinking agent crosslinks the fibers through hydrogen bonding and is suitably used in cases where the absorbent mat 3 is made by a wet process described infra. The term "binder" as used herein is intended to mean an adhesive (a substance that can be used to make two solids, either of the same or different kinds, stick together) except the above-mentioned crosslinking agents.

The binders which can be used include polyvinyl alcohol, modified starch, agar, carboxymethyl cellulose, polyacrylamide, and mixtures of two or more thereof. Polyvinyl alcohol and/or modified starch are preferred for their water absorptivity. It is preferred for the polyvinyl alcohol and the modified starch to have a gelatinization temperature of 60° C. or higher, particularly 70 to 80° C. With a gelatinization temperature of 60° C. or higher, the binder does not dissolve in the wetted absorbent mat 3 at room temperature, and the mat 3 keeps a certain wet strength not to lose its shape and is easy to handle and dispose of. The binder is preferably used in an amount of 1 to 45% by weight, particularly 5 to 45% by weight, especially 7 to 20% by weight, based on the mat 3.

Substances commonly used in wet papermaking as a strengthening agent can be used as the crosslinking agent. Such crosslinking agents include polyamidoamine epichlorohydrin resins, polyacrylamide, polyethylene, methylolated polyacrylamide, and mixtures thereof. These crosslinking agents can be used either as a sole interfibrous binder or in combination with water as a medium. The crosslinking agent is preferably used in an amount of 0.01 to 3% by weight, particularly 0.3 to 1% by weight, based on the mat 3.

Where the absorbent mat 3 contains water as a sole interfibrous binder, a preferred water content of the absorbent mat 3 is 1 to 20% by weight, particularly 5 to 20% by weight.

If desired, the absorbent mat 3 can further contain additives, such as a deodorizing agent and a masking agent, in addition to the above-mentioned components (i.e., the absorbing base material, the antimicrobial or non-antimicrobial surface active agent, the antimicrobial agent, and the interfibrous binder). A suitable amount of the additives ranges from 0.01 to 1% by weight, particularly from 0.03 to 0.1% by weight, based on the mat 3.

The absorbent mat 3 can be produced in either a dry process or a wet process. An example of the dry process comprises mixing the absorbing base material (e.g., plant fiber) with the surface active agent, the antimicrobial agent, the interfibrous binder (e.g., a binder), etc., molding the mixture in a mold of prescribed shape into a plate, preliminarily dewatering the resulting plate preform by hot pressing, and drying the plate to a desired water content in a drier, etc. For obtaining the desired bulk density and thickness, the hot pressing is preferably carried out under a pressure of 4 to 2400 kPa, particularly 10 to 1000 kPa, at a temperature of 60 to 120° C., particularly 20 to 105° C., for a period of 0.5 to 20 minutes, particularly 3 to 5 minutes.

The wet process can be carried out, for example, in accordance with a wire papermaking technique or a cylinder papermaking technique generally adopted for paper manufacturing. Known paper machines can be used. In the wet process the crosslinking agent (paper strengthening agent) is used for preference as an interfibrous binder as previously stated.

The clay minerals which can be used as a constituent material of the absorbent mat 3 include kaolin, bentonite, zeolite or diatomaceous earth.

The present invention is not limited to the above-described embodiment. For example, while the rib 8 of the holding frame in the embodiment is formed continuously on the whole inner periphery of the frame, the rib may be formed discretely.

The shape of the perforations of the perforated film as seen from the top is not limited to circles as in the embodiment described. The geometrical shape of the three-dimensional openings is not limited to a funnel-like shape, either. For example, the openings may have a cylindrical shape.

The present invention will now be illustrated in greater detail with reference to Examples. The following Examples are presented as being exemplary of the present invention and should not be considered as limiting. Unless otherwise noted, all the percents are by weight.

EXAMPLE 1

(1) Preparation of Absorbent Mat

SPG was mixed with a 2% aqueous solution of lauryldimethylamine oxide (Anhitol 20N, available from Kao Corp.) as an antimicrobial surface active agent in a Henschel mixer. The mixture was further mixed with tapioca starch (Z-100, available from Nichiden Kagaku K.K.) as an interfibrous binder. The mixture was cast in a mold of prescribed shape and dewatered. The resulting preform was pressed in a hydraulic press at 120° C. and 200 kPa for 15 minutes and then dried in a drier at 105° C. for 3 hours to prepare an absorbent mat. The resulting mat consisted of 88% of SPG, 2% of the antimicrobial surface active agent, and 10% of the binder.

(2) Preparation of Perforated Film

Low-density polyethylene was melt extruded through a T-die on a punching metal having a great number of holes. Simultaneously, the extruded film was vacuum-drawn from the other side of the punching metal to form three-dimensional openings at positions corresponding to the holes of the punching metal. The resulting perforated film had an open area ratio of 14.9% and a basis weight of 29.2 g/m$^2$. The openings had a diameter of 0.41 mm at the ends of their side walls.

(3) Preparation of Model Pet Toilet

The absorbent mat prepared in (1) above was cut into a piece of 100 mm by 100 mm. The perforated film prepared in (2) above, cut to a size of 150 mm wide and 150 mm long, was laid on the absorbent mat with the opening ends in contact with the mat and fixed at the periphery of the mat to make a model toilet.

(4) Measurement of Back Migration

Artificial urine was poured into the model toilet in amounts shown in Table 1 below at a rate of 100 cc/min. After 10 seconds from the completion of pouring, a stack of twenty thicknesses of filter paper (4A, available from Toyo Roshi Kaisha, Ltd.) was placed on the perforated film, and a 2 kg weight was put thereon for 3 seconds. The filter paper stack was removed and weighed. The difference of the filter paper stack weight between before and after absorption was taken as a back migration. The results obtained are shown in Table 1.

COMPARATIVE EXAMPLE 1

Core/sheath-type bicomponent fiber having polyethylene terephthalate as a core and polyethylene as a sheath (3.3 dtex; 51 mm) was carded into a web, and hot air was applied to the web to prepare an air-through nonwoven fabric having a basis weight of 25 g/m$^2$. A model toilet was assembled in the same manner as in Example 1, except for replacing the perforated film with the air-through nonwoven fabric. The back migration was measured in the same manner as in Example 1. The results are shown in Table 1.

TABLE 1

| | Back Migration (g) | | | | | | | |
|---|---|---|---|---|---|---|---|---|
| | Artificial Urine Pour (cc) | | | | | | | |
| | 50 | 100 | 150 | 200 | 250 | 300 | 350 | 400 |
| Example 1 | 0 | 0 | 0 | 0.2 | 0.22 | 0.2 | 0.18 | 0.22 |
| Comparative Example 1 | 0.08 | 0.18 | 0.38 | 0.78 | 0.82 | 0.88 | 1.11 | 1.08 |

The results in Table 1 apparently prove that the pet toilet of Example 1 according to the present invention greatly suppresses back migration of liquid compared with the comparative pet toilet. It is seen that the suppressive effect on back migration of the pet toilet of Example 1 holds good even after absorbing a large quantity of liquid.

As demonstrated, the pet toilet of the present invention suppresses back migration of urine even after absorbing a large quantity of urine. With the pet toilet of the invention, pet's excreta, whether solid or liquid, can be treated easily and economically. The pet toilet of the invention is particularly fit for domesticated dogs.

The invention having being thus described, it will be obvious that the same may be varied in many ways. Such variations are not be regarded as a departure from the spirit and scope of the invention, and all such modifications as would be obvious to one skilled in the art are intended to be included within the scope of the following claims.

This application claims the priority of Japanese Patent Application No. 2001-353618 filed Nov. 19, 2001, which is incorporated herein by reference.

What is claimed is:

1. A pet toilet comprising:
a shallow tray, a plate-shaped urine absorbent mat which is put in said tray, and a perforated film which has a number of openings and covers the entire upper surface of said absorbent mat, said openings of said perforated film being three-dimensional and having a sidewall extending from one side to the other side of the film, and said perforated film being fixed at such a position that at least the lower end of said sidewall of the openings is in contact with the upper surface of said absorbent mat,
wherein said tray has raised edges on the four sides thereof to make a depression in which said absorbent mat is put,
said pet toilet further comprises a holding frame which is engageable with said raised edges of said tray,
said holding frame is fitted on said raised edges of said tray with said perforated film interposed between said tray and said holding frame, and
said holding frame has a rib pendent from the whole periphery of the top frame thereof, and said perforated film is clamped between said rib and said raised edges of said tray.

2. A pet toilet comprising:
a shallow tray, a plate-shaped urine absorbent mat which is put in said tray, and a perforated film which has a number of openings and covers the entire upper surface of said absorbent mat, said openings of said perforated film being three-dimensional and having a sidewall extending from one side to the other side of the film, and said perforated film being fixed at such a position that at least the lower end of said sidewall of the openings is in contact with the upper surface of said absorbent mat,
wherein said absorbent mat is a plate molded from a molding material comprising plant fiber and pulp or a clay mineral, and
said molding material comprises (1) an absorbing base material comprising at least one of plant fiber and pulp, (2) an antimicrobial surface active agent or a combination of a surface active agent and an antimicrobial agent, and (3) at least one of a binder, a crosslinking agent, and water, and said absorbent mat has a bulk density of 0.05 to 0.3 g/cm$^3$, a saturated water absorption of 2 g/1 g or more, a rate of water absorption of 30 seconds or shorter, a wet strength of 49 cN or greater, and a thickness of 3 mm or larger.

3. A pet toilet, comprising:
a tray;
a urine absorbent mat positioned in the tray;
a perforated film having at least one opening and a sidewall, and covering at least a portion of the absorbent mat; and
a holding frame,
wherein the tray has a raised edge on each side, forming a depression into which the absorbent mat is positioned,
the at least one opening is three-dimensional,
the sidewall extends from a first side to a second side of the perforated film,
a lower end of the sidewall is in contact with an upper surface of the absorbent mat,
the holding frame is configured to engage with the raised edge, and
the holding frame includes a rib around a periphery of the holding frame, and the perforated film is positioned between the rib and the raised edge of the tray.

4. A pet toilet, comprising:
a tray;
a urine absorbent mat positioned in the tray;
a perforated film having at least one opening and a sidewall, and covering at least a portion of the absorbent mat,
wherein the at least one opening is three-dimensional,
the sidewall extends from a first side to a second side of the perforated film,
a lower end of the sidewall is in contact with an upper surface of the absorbent mat,
the absorbent mat includes a molded material including at least one of a plant fiber, pulp, or clay mineral, and
the molding material includes an absorbing base material including:
at least one of a plant fiber and a pulp;
at least one of an antimicrobial surface active agent and an antimicrobial agent; and
at least one of a binder, a crosslinking agent, and water.

5. A pet toilet, comprising:
a tray;
a urine absorbent mat positioned in the tray;
a perforated film having at least one opening and a sidewall, and covering at least a portion of the absorbent mat,
wherein the at least one opening is three-dimensional, the sidewall extends from a first side to a second side of the perforated film, a lower end of the sidewall is in contact with an upper surface of the absorbent mat, and the absorbent mat has at least one of the following:
a saturated water absorption of at least 2 g/1 g,
a rate of water absorption less than or equal to 30 seconds, and
a wet strength of at least 49 cN, and a thickness of at least 3 mm.

* * * * *